United States Patent [19]

Krajca

[11] 4,164,505

[45] Aug. 14, 1979

[54] FLOW PROCESS FOR CONJUGATING UNCONJUGATED UNSATURATION OF FATTY ACIDS

[75] Inventor: Kenneth E. Krajca, Lynn Haven, Fla.

[73] Assignee: Sylvachem Corporation, Jacksonville, Fla.

[21] Appl. No.: 814,139

[22] Filed: Jul. 8, 1977

[51] Int. Cl.$^2$ .......................... C09F 7/08; C11C 3/14
[52] U.S. Cl. ................................. 260/405.6; 260/417; 260/418; 260/419; 260/424
[58] Field of Search ..................... 260/405.6, 419, 424, 260/417, 418

[56] References Cited

U.S. PATENT DOCUMENTS

| 2,350,583 | 6/1944 | Bradley | 260/405.6 |
| 3,278,567 | 10/1966 | Rathjen | 260/405.6 |

FOREIGN PATENT DOCUMENTS

| 630634 | 10/1949 | United Kingdom | 260/405.6 |
| 1141690 | 1/1969 | United Kingdom | 260/405.6 |

*Primary Examiner*—John Niebling
*Attorney, Agent, or Firm*—Merton H. Douthitt

[57] ABSTRACT

A flow process for conjugating unconjugated unsaturation of fatty acids in the presence of alkali metal hydroxide under at least autogenic pressure at elevated temperature with control of the cis/trans to trans/trans ratio of the conjugated fatty acid product.

19 Claims, No Drawings

FLOW PROCESS FOR CONJUGATING UNCONJUGATED UNSATURATION OF FATTY ACIDS

BACKGROUND OF THE INVENTION

This invention relates to conjugating unconjugated unsaturation of fatty acids and in particular to a continuous flow process for accomplishing such conjugation with control of the cis/trans to trans/trans ratio of the conjugated fatty acid product.

Several prior proposals produce conjugated fatty acids in the presence of alkali bases. For example, it has been proposed (U.S. Pat. No. 2,350,583) to conjugate unsaturated higher fatty acids by heating a reaction mixture of an aqueous solution of alkali soaps of the fatty acids containing an excess of alkali in water for several hours at elevated temperature and under autogenic pressure for producing such conjugated fatty acids. Similar conjugation processes operate under substantially anhydrous conditions (for example, U.S. Pat. Nos. 2,389,260 and 2,242,230). Another prior proposal utilizes an ether of a polyhedric alcohol which contains a free hydroxyl group as a solvent to dissolve the fatty acid soaps in order to cause the conjugation to occur (U.S. Pat. No. 2,343,644).

The present invention provides a continuous flow process for conjugating unconjugated unsaturation of fatty acids wherein the cis/trans to trans/trans ratio of the conjugated fatty acid product is monitored during the reaction and such ratio of the crude product is controlled thereby. The present flow process also is extremely efficient and rapid.

SUMMARY OF THE INVENTION

The present invention is a flow process for conjugating unconjugated unsaturation of fatty acids, typically linoleic and linolenic acid, in feedstock containing appreciable content of same in the presence of requisite aqueous alkali metal hydroxide for providing a minor proportion of free alkali in the resulting reaction mixture and the dissolution of the resulting alkali metal soap in the aqueous phase of said reaction mixture. Such flow process comprises continuously charging said feedstock, said alkali metal hydroxide, and water into a flow reaction zone maintained under at least autogenous pressure and therein heating the resulting reaction mixture to a temperature of about 200° to 370° C. From the flow reaction zone, a crude product stream is continuously withdrawn when the unconjugated fatty acid value therein has been reduced essentially to 0 and a cis/trans to trans/trans fatty acid ratio of the crude product stream is between about 50:1 and about 0.1:1. The withdrawn crude fatty acid stream then is acidulated to spring a crude conjugated fatty acid product, which product is recovered. The crude fatty acid product then is refined.

DETAILED DESCRIPTION OF THE INVENTION

Although any unconjugated polyunsaturated fatty acid can be conjugated according to the present process, the unconjugated unsaturated fatty acids of the most practical interest are linoleic acid and linolenic acid as these acids can be found in significant amounts in natural glyceride oils and especially in vegetable oils. Conjugated unsaturated fatty acids find utility in the manufacture of alkyd paints, lacquers, varnishes, drying oils and waxes, and the like, because of their superior drying properties and good performance which they contribute to such paints.

Vegetable oil refining operations provide a good source of supply of linoleic and linolenic acids useful as feedstock for the present process. For convenience herein, linoleic acid will be used to refer to those unconjugated unsaturated fatty acids useful in the present process as linoleic acid by far is the most plentiful fatty acid available for use in this process. Linoleic acid can appear in various forms in the feedstock for the present process. The linoleic acid can be a part of a mixture of free fatty acids wherein various saturated or mono-unsaturated fatty acids make up the remainder of such free fatty acid mixture. Other useful feedstocks containing linoleic acid include partial and full fatty acid glycerides, fatty acid esters such as alkyl esters, fatty acid salts (soaps) and mixtures thereof. One convenient feedstock source for the present invention is known as "acid oil" which is that product obtained from the acidulation of crude soapstock with mineral acid and generally contains free fatty acids, various glycerides, and a variety of minor impurities. While the present process performs efficiently on feedstock containing but a few percent linoleic acid, efficiency and economy are best served with feedstocks containing appreciable content of linoleic acid, for example, from about 30% to about 80% linoleic acid. Representative oils containing appreciable unconjugated fatty acids for the present process include, for example, the oils: corn, cottonseed, peanut, safflower, sunflower, soybean, linseed, dehydrated castor, rapeseed, and some marine (fish) oils.

The alkaline agent preferably is a water soluble alkali metal base such as an alkali metal hydroxide (or oxide) for efficiency and economy, though other water soluble alkali metal bases can find use in the present process. Sufficient alkali metal hydroxide, sodium hydroxide for economy, is used to completely (stoichiometrically) saponify the fatty acid content of the feedstock (the neutralization point being at a pH of about 11.7) and preferably somewhat in excess of this amount so that a minor amount of free alkali is present in the aqueous reaction mixture. Typically about 1% to 20% of stoichiometric excess alkali provides a good working range for the present process, though lower excess alkali quantities are preferred for minimizing costs.

The present process is practiced by continuously charging the linoleic acid-containing feedstock and aqueous alkali metal hydroxide into a flow reaction zone maintained under at least autogenous pressure. Alternatively, the feedstock, base, and water can be charged separately to the reaction zone or a preformed aqueous soap of the fatty acids can be charged into the zone. Typically, sufficient water is admitted to the flow reaction zone to dissolve the alkali metal soaps which are formed therein. Generally, from about 40% to about 85% water by weight of the reaction mixture in the flow reaction zone is used in the present process. The flow reaction zone contents, held under at least autogenic pressure, are heated to a temperature of about 200° to 370° C., advantageously about 220° to 330° C. with temperatures of about 250° to about 300° C. being preferred. Of course, the reaction temperature should not exceed the critical temperature of water (374° C.). Use of greater than autogenic pressure can be used for minimizing flashing or vaporization of water in the flow reaction zone. The flow reaction zone conveniently can be a simple tubular flow-reactor provided with an inlet for feed, an outlet for product removal, and means to monitor the composition of the products from such flow reactor. Reaction times for the present conjugation process are quite small and generally range from about 1 to about 40 minutes, depending upon a variety of factors such as concentration of linoleic acid in the feedstock, desired composition of the crude product stream being made, reaction temperature, and free alkali concentration.

The contents of the flow reaction zone are periodically monitored to determine the value of unconjugated linoleic acid in the reaction zone. Also, the cis/trans to trans/trans fatty acid ratio of the crude product stream is monitored. When the unconjugated linoleic acid value of the contents of the zone has been determined to be practically 0 and the cis/trans to trans/trans fatty acid ratio is between about 50:1 and about 0.1:1, the crude fatty product stream is continuously withdrawn from the zone. Gas phase chromotography is a simple and convenient monitoring means to determine the extent of conjugation of linoleic acid in the zone and the desired cis/trans to trans/trans fatty acid ratio, though other techniques, such as infrared spectroscopy and the like, can be employed. It should be noted that about 3%-4% artifacts may register as unconjugated linoleic acid by gas phase chromatography when such linoleic acid has disappeared; thus, the conjugation is deemed to be virtually complete when the unconjugated linoleic acid value has been reduced to "practically zero". Conjugation of at least about 95% of the unconjugated linoleic acid fed to the process usually is achieved in the present process. The cis/trans to trans/trans fatty acid ratio of the conjugated linoleic acid determines the reactivity of such conjugated linoleic acid. A desirable cis/trans to trans/trans fatty acid ratio of the conjugated linoleic acid is about 2.5:1.

The withdrawn crude product stream then is acidulated, preferably with mineral acid, to spring the crude fatty acid product therefrom. The acidulated crude product stream then forms a lower aqueous layer and an upper fatty acid oil layer containing the crude fatty acid product. The upper fatty acid oil layer is separated conventionally by decantating, centrifuging or the like. The separated crude fatty acid product then is refined to provide a purified conjugated fatty acid product. Conventional refining techniques include dehydrating the crude fatty acid product at about 80° to 100° C. under vacuum, followed by stripping operations, such as vacuum distillation techniques or the like, to provide a conjugated linoleic acid stream.

The following examples show in detail how the present invention can be practiced but should not be construed as limiting. In this specification all temperatures are in degrees Centigrade, all percentages are weight percentages, and all units are in the metric system, unless otherwise expressly indicated.

EXAMPLE 1

4,631 parts by weight of a mixture of soybean and cottonseed fatty acids containing 61% linoleic acid was added to 27,306 parts by weight of water and sufficient 50% aqueous sodium hydroxide at about 80° C. to form a fatty acid soap mixture having a pH of 12.5. The aqueous soap mixture was continuously charged into a tubular flow reactor, held at a pressure of 2,300 psig, at a flow rate of about 0.25 liters/sec. (4 gallons/minute). The temperature of the reaction zone was 252° C. and the residence time of the soap in the reactor was about 25 minutes.

The conjugated soap was acidulated with sulfuric acid to spring the conjugated fatty acid product which then was dehydrated and distilled. Gas phase chromatography of the product fatty acids indicated about 59% conjugated linoleic acid having a cis/trans ratio of about 6:1. These results show the exceptional speed of reaction and efficiency of conjugation (about 97%) obtained in the present process.

EXAMPLE 2

The procedure of Example 1 was repeated except that the reaction temperature was adjusted to 271° C. The fatty acid product was found to contain about 58% conjugated linoleic acid having a cis/trans to trans/trans ratio of about 3:1.

What is claimed is:

1. A flow process for conjugating unconjugated unsaturation of fatty acids in feedstock containing same and controlling the cis/trans to trans/trans ratio of the resulting conjugated fatty acid product in the presence of requisite aqueous alkali metal hydroxide for providing a minor proportion of free alkali in the resulting reaction mixture, and the dissolution of the resulting alkali metal soap in the aqueous phase of said reaction mixture which comprises:

continuously charging said feedstock, said alkali metal hydroxide, and water into a flow reaction zone maintained under at least autogenous pressure;

therein heating the resulting reaction mixture to a temperature of about 200° to 370° C.;

continuously withdrawing from said zone the crude product stream when the unconjugated fatty acid value therein has been reduced to practically zero and the cis/trans to trans/trans fatty acid ratio of said crude product stream is between about 50:1 and 0.1:1;

acidulating the crude product stream, thereby springing crude fatty acid product; and recovering said crude fatty acid product.

2. The flow process of claim 1 wherein said unconjugated fatty acids comprise linoleic acid, linolenic acid, and mixtures thereof.

3. The process of claim 2 wherein said feedstock is a glyceride oil.

4. The process of claim 1 wherein said feedstock is a mixture of fatty acids containing said unconjugated fatty acids.

5. The flow process of claim 1 wherein a soap is formed from said fatty acids and said alkali metal hydroxide, and said soap is the feedstock charged into said zone.

6. The flow process of claim 1 wherein said feedstock comprises partial esters of said fatty acids and polyol.

7. The flow process of claim 6 wherein said polyol is glycerol.

8. The flow process of claim 6 wherein said polyol is glycol.

9. The flow process of claim 1 wherein said feedstock comprises alkyl esters of said fatty acids.

10. The flow process of claim 1 wherein said feedstock contains about 30 to about 80% by weight of said unconjugated fatty acids.

11. The flow process of claim 1 wherein said alkali metal hydroxide is sodium hydroxide.

12. The process of claim 1 wherein about 1 to about 20% stoichiometric excess of said alkali metal hydroxide is charged into said zone.

13. The flow process of claim 1 wherein the proportion of water in said reaction mixture is about 40% to about 85% by weight.

14. The flow process of claim 1 wherein said reaction mixture is heated to about 220° to 330° C.

15. The flow process of claim 14 wherein said temperature is about 250° to 300° C.

16. The flow process of claim 1 wherein the residence time of said reaction mixture in said zone is from about 1 to about 40 minutes.

17. The flow process of claim 1 wherein the cis-trans to trans-trans fatty acid ratio of said crude product stream is about 2.5:1.

18. The process of claim 1 wherein said recovered crude fatty acid product is refined.

19. The flow process of claim 18 wherein said refining step includes dehydration of said recovered crude fatty acid product under vacuum and distillation of said dehydrated crude fatty acid product.

* * * * *